Patented Dec. 8, 1953

2,662,084

UNITED STATES PATENT OFFICE 2,662,084

PREPARATION OF N-CARBOANHYDRIDES OF ALPHA AMINO ACIDS

Robert Neal MacDonald, New Castle, Del., assignor to E. I. du Pont de Nemours and Company, Wilmington, Del., a corporation of Delaware No Drawing. Application March 24, 1949, Serial No. 83,299

17 Claims. (Cl. 260—307)

This application is a continuation-in-part of my copending application, Serial No. 778,458, filed October 7, 1947, now abandoned.

This invention has as an object the provision of a new method for preparing the N-carboanhydrides of hydrocarbon alpha-primary-aminocarboxylic acids of two to eleven carbons in which the alpha-carbon is only singly bonded. A further object is the provision of a process by which the water-sensitive N-carboanhydrides of hydrocarbon alpha-primary-aminocarboxylic acids of two to eleven carbons may be prepared in improved yields. Another object is to provide a method whereby water-sensitive N-carboanhydrides of hydrocarbon alpha-primary-aminocarboxylic acids of two to eleven carbons may be prepared directly from the amino acid in one step without the necessity of isolating intermediate compounds. Other objects will appear hereinafter.

These objects are accomplished by the present invention wherein an alpha-primary-aminocarboxylic acid of the formula

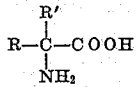

wherein R′ is hydrogen or methyl, i. e.,

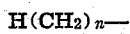

where $n$ is a cardinal number not greater than 1, i. e., $H(CH_2)_{m-1}$— where $m$ is a positive integer not greater than 2, and R is hydrogen or a hydrocarbon radical of not more than eight carbons or an alkali metal, alkaline earth metal, or hydrohalide salt of said acid is reacted at temperatures in the range of —70 to 100° C. and under anhydrous conditions with phosgene. Preferred for reasons of increased rate of reaction with no attendant decrease in yield due to thermal decomposition, are temperatures in the range of —10° to 65° C. Solvents for the N-carboanhydrides, non-reactive with phosgene are preferably used. Also preferred, for reasons of ease of formation of the N-carboanhydride ring and the greater water and thermal sensitivity and corresponding ease of polymerization thereof, are amino acids and their alkali or alkaline earth metal salts wherein the radical R of the above formula is hydrogen or an alkyl radical of up to four carbons, i. e., R is $C_nH_{2n+1}$ where $n$ is a cardinal number not greater than four. Alpha-primary-aminoalkanoic acids $H_2N$—R—COOH wherein R is an alkylidene radical of not more than four carbons having its free valences or unfilled bonds stemming from a carbon not more than second in the carbon chain of the alkylidene radical, i. e., from a carbon carrying at most one hydrogen, are the acids to which the process of this invention is usually applied.

The following examples in which the parts given are by weight further illustrate the process of this invention:

Example I

Forty-three and one-half (43½) parts of the sodium salt of alpha-aminoisobutyric acid is covered with a large excess of liquid phosgene in a reaction vessel protected from the atmosphere with drying tubes, while the vessel is cooled by a solid carbon dioxide/acetone bath. The reaction vessel is then removed to an ice bath and allowed to remain under such conditions overnight. The excess phosgene is removed by distillation; the solid product remaining is triturated with methylene chloride; the resulting slurry of sodium chloride and methylene chloride is filtered, and the methylene chloride removed by distillation of the filtrate, all under anhydrous oxygen-free conditions. There is obtained 3.0 parts of snow-white, crystalline N-carboanhydride of alpha-aminoisobutyric acid sintering but not melting at 90–95° C.

Example II

Gaseous phosgene (purified by passage through cottonseed oil and subsequently through concentrated sulfuric acid) is passed into a refluxing (58–62° C.) solution of 16.5 parts of DL-phenylalanine in 148.9 parts of dry chloroform for 2½ hours in a vessel protected from the atmosphere with drying tubes. At the end of this time the reaction mixture is filtered hot through a Büchner funnel and the residue washed with dry chloroform under anhydrous conditions. Upon addition of 292.5 parts of dry petroleum ether to the filtrate, fine white crystals of the N-carboanhydride of DL-phenylalanine are obtained. After isolation by filtration under anhydrous conditions and drying in a vacuum desiccator, there is obtained 12 parts of the N-carboanhydride of DL-phenylalanine melting at 127–128° C. and decomposing at 145° C. The mixed melting point of this material with an authentic sample of the N-carboanhydride of DL-phenylalanine prepared by the method of Leuchs is 127–128° C.

Example III

Five (5) parts of DL-norleucine is placed in a closed glass reactor fitted with gas inlet and exit tubes. The reactor and its contents are heated to 60° C. and a slow stream of gaseous phosgene passed over the reaction mixture for ten minutes. The solid changes in appearance from free-flowing plates to a lumpy solid mass. The reactor is cooled, opened, and the reaction mixture extracted with anhydrous diethyl ether. The clear, etheral extract so obtained is concentrated in volume and cooled. After filtration of the concentrate, there is obtained 1.3 parts (21.2% conversion) of DL-norleucine N-carboanhydride as white crystals melting at 74° C.

*Example IV*

A suspension of one part of DL-norleucine in 20 parts of purified anhydrous benzene is prepared in a reactor open to the atmosphere through drying tubes and equipped with a reflux water condenser, a stirrer and an inlet tube connected to a source of gaseous phosgene and so arranged that its lower extremity is just above the surface of the liquid. The suspension is heated to 50–55° C. with stirring and a metered stream of gaseous phosgene is passed into the reaction mixture until 1.5 parts (200% of the theoretical amount of phosgene required) is added. Only a small part of the starting amino acid dissolves in the benzene. The reaction mixture is pressured through a sintered glass filter with nitrogen under anhydrous conditions. The white, insoluble residue (DL-norleucine hydrochloride) thus obtained represents 91% of the original amino acid. Upon removal of the benzene from the clear filtrate by distillation under reduced pressure, there is obtained 0.12 part (9% conversion) of the N-carboanhydride of DL-norleucine as white crystals melting at 78.0–78.5° C.

*Example V*

In a reactor similar to the one described in the preceding example, a suspension of 10 parts of DL-phenylalanine in 170.7 parts of nitromethane is treated with gaseous phosgene at 80–85° C. for 20 minutes at such a rate that 233% of the theoretical amount of phosgene is added. At the end of this time part of the solid material has dissolved. The reaction mixture is filtered hot through a sintered glass filter with nitrogen pressure under anhydrous conditions. There is thus obtained 4.66 parts (35% recovery based on the starting amino acid) of DL-phenylalanine hydrochloride. The nitromethane is removed from the clear filtrate by distillation under reduced pressure. There is thus obtained 7.3 parts (65% conversion and 100% yield) of the N-carboanhydride of DL-phenylalanine as white crystals melting at 130–133° C.

*Example VI*

In a reactor similar to the one described in Example IV, ten parts of DL-norleucine is suspended in 158.4 parts of purified anhydrous acetone. The reaction mixture is heated to 50–55° C. and gaseous phosgene passed in. Most of the solid dissolves. The acetone is removed from the reaction mixture by distillation under reduced pressure. There is thus obtained crystalline N-carboanhydride of DL-norleucine.

*Example VII*

In a reactor similar to the one described previously in Example IV except that the reflux condenser is cooled with ice water, a suspension of two parts of the sodium salt of glycine in 6.4 parts of acetonitrile is heated to 50° C. and phosgene passed into the reaction mixture for 5 minutes at such a rate that 2.47 parts (116% of theory) is added. Heating at 50° C. is continued for an additional 25 minutes. The reaction mixture is then heated to 60° C. and, while hot, pressured through a sintered glass filter with nitrogen under anhydrous conditions. The clear filtrate so obtained is evaporated to dryness under reduced pressure. There is thus obtained 0.11 part (7% of theory) of the N-carboanhydride of glycine as white crystals. Upon recrystallization from warm ethyl acetate/petroleum ether the product was analyzed.

*Analysis.*—Calculated for $C_3H_3O_3N$: N, 13.8%. Found: N, 14.17%.

This example illustrates a preferred mode of operation of the invention wherein the reaction is conducted in a normally liquid alkanonitrile, i. e., alkyl cyanide, e. g. acetonitrile.

*Example VIII*

In a reactor similar to the one described in Example IV, is placed five parts of 2-amino-4,6,6-trimethylheptanoic acid (prepared as described in the copending application of MacDonald, filed October 7, 1947, Serial No. 778,459). The reactor and its contents are heated to 60° C. and phosgene passed into the reaction zone for 20 minutes at such a rate that 9.9 parts (370% of the theoretical amount required) are added. The reaction mixture is maintained at 60° C. for an additional 10 minutes and is then allowed to cool to room temperature. The resulting solid is extracted with 70.6 parts of anhydrous diethyl ether. The solvent is removed from the clear liquid extract by distillation under reduced pressure. There is thus obtained 1.06 parts (19% of theory) of slightly impure 2-amino-4,6,6-trimethylheptanoic acid N-carboanhydride as white crystals melting at 84–90° C. This material after recrystallization from ether/petroleum ether mixtures is obtained as pure white needles melting at 91–92° C.

*Example IX*

In a reactor similar to the one described in Example IV, two parts of the barium salt of DL-leucine is suspended in 6.7 parts of chloroform. The suspension is cooled to 0° C. and phosgene passed in for 10 minutes at such a rate that 3.9 parts (400% of the theoretical amount) is added. The reaction mixture is warmed to 30° C. and pressured with nitrogen through a sintered glass filter under anhydrous conditions. The chloroform is removed from the clear filtrate by evaporation under anhydrous conditions. There is thus obtained 0.24 part (15% of theory) of the N-carboanhydride of DL-leucine as white crystals which upon recrystallization from ether/petroleum ether mixture melt at 44–45° C.

*Example X*

A suspension of 29.4 parts of alpha-aminoisobutyric acid hydrochloride in 500 parts of purified anhydrous dioxane is stirred rapidly at 90–95° C. in a reaction vessel similar to that described in Example IV and gaseous phosgene is admitted into the reaction mixture until 30.7 parts (110% of the theoretical amount of phosgene required) is added. The hot reaction mixture is then pressure filtered through a suitable filter with nitrogen under anyhdrous conditions. There is thus obtained 11.9 parts (40.5% recovery) of the starting alpha-aminoisobutyric acid hydrochloride. Approximately 90% of the dioxane is removed from the clear filtrate by passage through a stripping still at 60° C. under 20 millimeters of mercury pressure. Petroleum ether is then added with stirring to the clear concentrate so obtained until no further precipitation occurs. The precipitate is removed by pressure filtration with nitrogen under anhydrous conditions. There is thus obtained 14.9 parts (54.3% conversion and 91% yield) of the N-carboanhydride of alpha-aminoisobutyric acid as white crystals melting at 95° C. The method of this example, employing an ether as the solvent, is the subject of Prichard application Serial No. 52,971, filed October 5, 1948.

The process of this invention is of generic application to hydrocarbon alpha-primary-aminocarboxylic acids and their alkali metal, alkaline earth metal, and hydrohalide salts which amino acid has the formula,

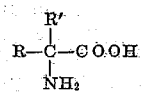

wherein R is hydrogen or a hydrocarbon radical of no more than eight carbons and R' is hydrogen or methyl, i. e., the carboxyl is not more than one carbon from the end of the chain. Particularly useful are the alpha-primary-aminoalkanoic acids and their alkali metal or alkaline earth metal salts.

Specific amino acids, and their appropriately protected derivatives in the case of those acids containing groups reactive with phosgene such as hydroxyl, mercaptan, etc., operable in the process of this invention include hydrocarbon alpha-primary aminocarboxylic acids of 2 to 11 carbons whose alpha-carbon is acyclic in nature and which are, apart from the amino and carboxyl groups, hydrocarbon, such as glycine; C-alkyl-glycines, e. g., alanine, alpha-amino-n-butyric acid, valine, norvaline, leucine, norleucine, pseudoleucine, isoluecine, alpha-aminocaprylic acid, 2-amino-4,6,6-trimethylheptanoic acid; C-aralkyl glycines, e. g., beta-phenylalanine; C-cycloalkylglycines, e. g., C-cyclohexylglycine; C-alkyl-C-methyl glycines, e. g., alpha-aminoisobutyric acid, alpha - amino - alpha,-gamma - dimethylvaleric acid, alpha - amino-alpha-methylbutyric acid. The alkali metal salts, such as the sodium and potassium salts, and the alkaline earth metal salts, such as the calcium and magnesium salts, of these alpha-primary-aminocarboxylic acids may also be used in the process of this invention. Preferred for reasons of readier availability are the free alpha-primary-aminocarboxylic acids of the previously described formula.

The process of this invention is of outstanding utility in the preparation of the N-carboanhydrides of the alpha-primary-aminocarboxylic acids of the previously-given formula wherein R contains at most four carbon atoms and R' is hydrogen or methyl because of the increased water sensitivity and thermal instability of the N-carboanhydrides of these acids. Further, when R' in the above-given formula is solely hydrogen and R is an alkyl radical of no more than four carbons, the utility of the process of this invention becomes even more apparent since the N-carboanhydrides of these acids are even more markedly water-sensitive.

Although as has been pointed out in the specification, the broad range of operating temperature conditions usable in the process of this invention varies from —70 to +100° C., and preferably from —10 to +65° C., the specific operating temperature range for the individual acids and their salts usable in the process of this invention will vary somewhat from acid to acid depending upon the thermal stability of the intermediate N-carbamyl chlorides and the desired end product N-carboanhydride. Thus, it is necessary for optimum yields to carry out the reaction at temperatures below which the desired end product N-carboanhydride starts to decompose at an appreciable rate and above which the intermediate N-carbamyl chloride is unstable.

By "alpha-carbon atom" is meant, of course, the carbon atom of the amino acid bearing the carboxyl group.

In the claims, unless otherwise indicated, it is to be understood that the alkali metal, alkaline earth metal, and hydrohalide salts of an amino acid are equivalent to the amino acid per se.

As many apparently widely different embodiments of this invention may be made without departing from the spirit and scope thereof, it is to be understood that this invention is not limited to the specific embodiments thereof except as defined in the appended claims.

What is claimed is:

1. A method for preparing the N-carboanhydrides of hydrocarbon alpha-primary-aminocarboxylic acids which comprises reacting phosgene at temperatures within the range —70 to +100° C. and under anhydrous conditions with a C-monoalkylglycine of not more than 6 carbons.

2. A method for preparing the N-carboanhydrides of hydrocarbon alpha primary amino carboxylic acids of 2–11 carbons which have the one primary amino group and the one carboxyl group satisfying the two valences of a bivalent hydrocarbon radical, which two valences stem from an acyclic carbon of said hydrocarbon radical which acyclic carbon is not more than one carbon from an end of the acyclic chain of said radical, which comprises reacting phosgene at temperatures within the range —70 to +100° C. and under anhydrous conditions with a member of the class consisting of said acids and their alkali metal, alkaline earth metal, and hydrohalide salts.

3. A method for preparing the N-carboanhydride of a hydrocarbon alpha primary amino carboxylic acid of 2–11 carbons which has the one primary amino group and the one carboxyl group satisfying the two valences of a bivalent hydrocarbon radical, which two valences stem from an acyclic carbon of said hydrocarbon radical which acyclic carbon is not more than one carbon from an end of the acyclic chain of said radical, which comprises reacting phosgene at temperatures within the range —70 to +100° C. and under anhydrous conditions with said acid.

4. A method for preparing the N-carboanhydride of a hydrocarbon alpha primary amino carboxylic acid of 2–11 carbons which has the one primary amino group and the one carboxyl group satisfying the two valences of a bivalent hydrocarbon radical, which two valences stem from an acyclic carbon of said hydrocarbon radical which acyclic carbon is not more than one carbon from an end of the acyclic chain of said radical, which comprises reacting phosgene at temperatures within the range —70 to +100° C. and under anhydrous conditions with an alkali metal salt of said acid.

5. A method for preparing the N-carboanhydride of a hydrocarbon alpha primary amino carboxylic acid of 2–11 carbons which has the one primary amino group and the one carboxyl group satisfying the two valences of a bivalent hydrocarbon radical, which two valences stem from an acyclic carbon of said hydrocarbon radical which acyclic carbon is not more than one carbon from an end of the acyclic chain of said radical, which comprises reacting phosgene at temperatures within the range −70 to +100° C. and under anhydrous conditions with an alkaline earth metal salt of said acid.

6. A method for preparing the N-carboanhydride of a hydrocarbon alpha primary amino carboxylic acid of 2–11 carbons which has the one primary amino group and the one carboxyl group satisfying the two valences of a bivalent hydrocarbon radical, which two valences stem from an acyclic carbon of said hydrocarbon radical which acyclic carbon is not more than one carbon from an end of the acyclic chain of said radical, which comprises reacting phosgene at temperatures within the range −70 to +100° C. and under anhydrous conditions with a hydrohalide salt of said acid.

7. Process according to claim 3 wherein the amino acid is an alpha-primary-aminoalkanoic acid.

8. Process according to claim 4 wherein the alkali metal salt is an alkali metal salt of an alpha-primary-aminoalkanoic acid.

9. Process according to claim 5 wherein the alkaline earth metal salt is an alkaline earth metal salt of an alpha-primary-aminoalkanoic acid.

10. Process according to claim 6 wherein the hydrohalide salt is a hydrohalide salt of an alpha-primary-aminoalkanoic acid.

11. Process of claim 2 wherein glycine N-carboanhydride is prepared.

12. Process of claim 2 wherein alpha-aminoisobutyric acid N-carboanhydride is prepared.

13. Process of claim 2 wherein leucine N-carboanhydride is prepared.

14. The process of claim 2 wherein phenylalanine-N-carboanhydride is prepared.

15. Process of claim 2 wherein alanine N-carboanhydride is prepared.

16. In the preparation of the N-carboanhydride of an alpha-primary aminocarboxylic acid which has the primary amino group on an acyclic alpha-carbon atom and which is hydrocarbon except for the amino and carboxyl groups, the improvement wherein phosgene is reacted in an anhydrous medium with a member of the class consisting of said acid and salts thereof.

17. In the preparation of the N-carboanhydride of an alpha-primary aminocarboxylic acid of 2 to 9 carbons whose alpha carbon is acyclic and which is, apart from the amino and carboxyl groups, hydrocarbon, the improvement wherein phosgene is reacted in an anhydrous medium with said acid.

ROBERT NEAL MacDONALD.

References Cited in the file of this patent

Erdmann: Ber. Deut. Chem. Gesell., vol. 32:2159–2172 (1899).

Fuchs: Ber. Deut. Chem. Gesell., vol. 55-B:2943 (1922).